(12) United States Patent
Monnee

(10) Patent No.: US 12,287,093 B2
(45) Date of Patent: Apr. 29, 2025

(54) GAS BURNER SYSTEM AND METHOD OF OPERATING THE SAME

(71) Applicant: Pilz GmbH & Co. KG, Ostfildern (DE)

(72) Inventor: Lambertus Peter Monnee, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 436 days.

(21) Appl. No.: 17/737,785

(22) Filed: May 5, 2022

(65) Prior Publication Data
US 2022/0357036 A1    Nov. 10, 2022

(30) Foreign Application Priority Data
May 7, 2021 (DE) .......................... 102021112034.9

(51) Int. Cl.
*F23N 5/10* (2006.01)

(52) U.S. Cl.
CPC ...... *F23N 5/102* (2013.01); *F23C 2900/9901* (2013.01); *F23N 2225/08* (2020.01)

(58) Field of Classification Search
CPC ................. F23N 5/102; F23N 2225/08; F23C 2900/9901
USPC ........................................................ 431/10
See application file for complete search history.

(56) References Cited

U.S. PATENT DOCUMENTS

| | | | | |
|---|---|---|---|---|
| 3,699,905 | A | * | 10/1972 | Gach .......................... F23G 5/50 110/193 |
| 5,295,818 | A | | 3/1994 | Robinson |
| 6,139,311 | A | * | 10/2000 | Bowman ................... F23C 7/02 431/278 |
| 2007/0254252 | A1 | | 11/2007 | Schaefer |

FOREIGN PATENT DOCUMENTS

| | | |
|---|---|---|
| AT | 510002 A4 | 1/2012 |
| DE | 4037397 A1 | 5/1991 |
| DE | 19734574 A1 | 2/1999 |

(Continued)

OTHER PUBLICATIONS

Slim et. al.(Slim, B.K. Darmeveil, H. van Dijk, G.H.J. Last, D. Pieters, G.T. Rotink, M.H. Overdiep, J.J. and Levinsky, H.B. Should We Add Hydrogen to the Natural Gas Grid to Reduce CO2-Emissions? 23rd World Gas Conference, Amsterdam 2006).*

(Continued)

*Primary Examiner* — Vivek K Shirsat
(74) *Attorney, Agent, or Firm* — Edell, Shapiro & Finnan, LLC

(57) ABSTRACT

A method for monitoring an operation of a gas burner system in which a fuel/air mixture is ignited and a flame is generated by a burner during operation, includes: measuring the temperature of the flame by a flame temperature measurement installation that is actively cooled by impingement with cooling air; evaluating the temperature of the flame by an evaluation installation; interrupting a fuel supply to the burner in response to the temperature of the flame dropping below a critical value or having a specific negative gradient; determining an air-fuel ratio from the temperature of the flame; and interrupting the fuel supply to the burner in the event of an anomaly in the air-fuel ratio.

12 Claims, 1 Drawing Sheet

(56) References Cited

FOREIGN PATENT DOCUMENTS

| | | |
|---|---|---|
| DE | 19847832 C1 | 11/1999 |
| DE | 19903305 A1 | 8/2000 |
| DE | 102004030299 A1 | 1/2006 |
| DE | 102010017195 A1 | 12/2010 |
| DE | 10045270 A1 | 3/2022 |
| GB | 2444109 A | 5/2008 |
| WO | 2020/182902 A1 | 9/2020 |

OTHER PUBLICATIONS

Office Action in corresponding German Patent Application No. 10 2021 112 034.9, dated Feb. 16, 2022, with English translation.
European Search Report with English translation in European Application No. 22 16 4789.4, dated Sep. 30, 2022, 9 pages.

* cited by examiner

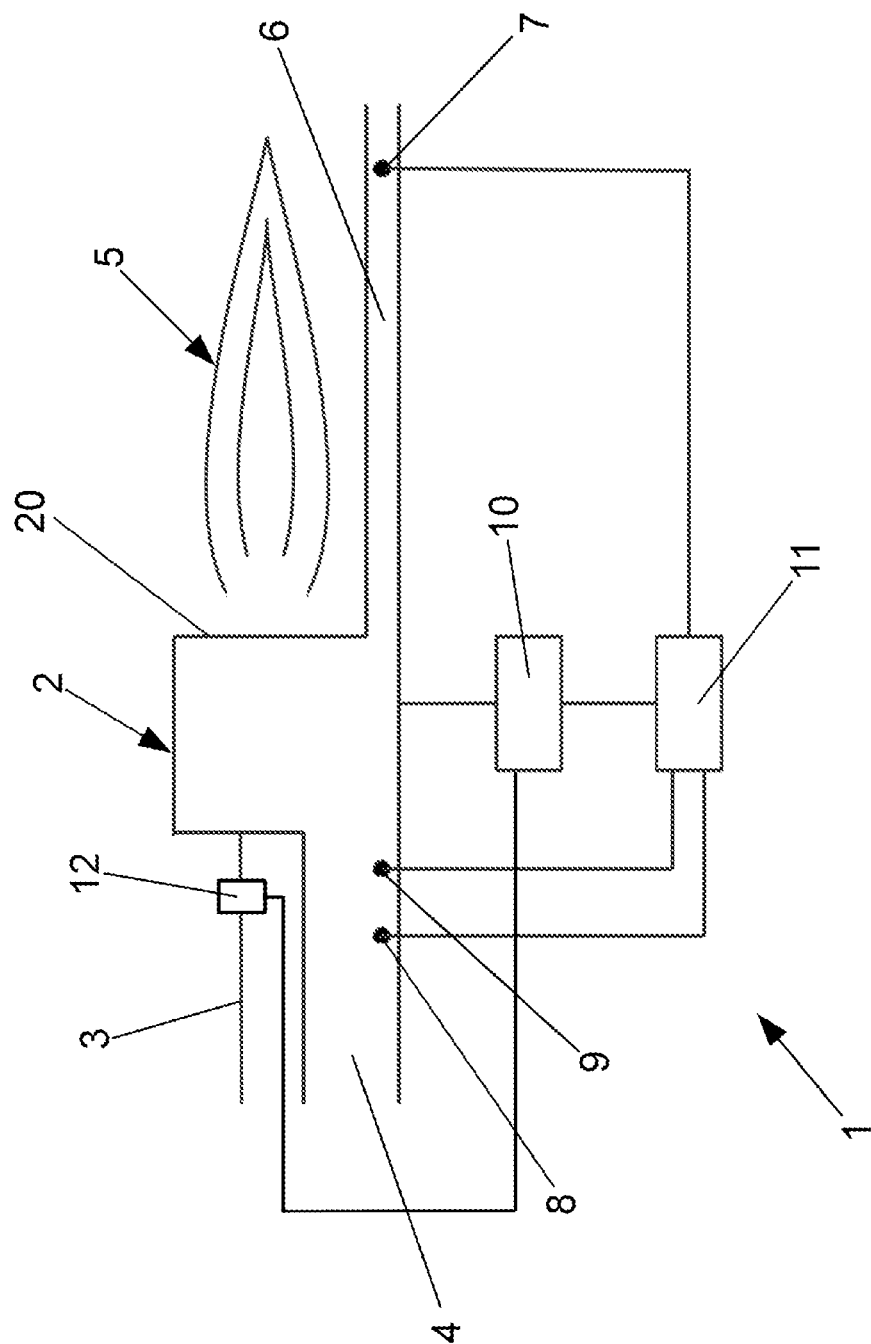

GAS BURNER SYSTEM AND METHOD OF OPERATING THE SAME

CROSS REFERENCE TO RELATED APPLICATIONS

This application claims foreign priority under 35 U.S.C. § 119(a)-(d) to Application No. DE 102021112034.9 filed on May 7, 2021, the entire contents of which are hereby incorporated by reference.

TECHNICAL FIELD

The present disclosure relates to a method for monitoring an operation of a gas burner system. The present disclosure moreover relates to a gas burner system.

BACKGROUND

Gas burner systems which can be used in gas condensing boiler devices, for example, are known in numerous different embodiments in the prior art. These gas burner systems have a burner by which a fuel/air mixture can be combusted during operation. To be able to monitor the operation of gas burner systems of this type, it is necessary for different operating parameters of the burner to be detected and evaluated. This also includes monitoring of the flame, for example.

Methods for monitoring the flame of a burner which are based on measuring the flame temperature, for example, are known from the prior art. Methods of this type utilize at least one thermocouple which by way of the temperature-sensitive region thereof extends into the flame. An electric voltage which is generated by the flame temperature by virtue of the thermoelectric effect (Seebeck effect) in the case of an active flame is capable of keeping a fuel valve of the gas burner system open, counter to a mechanical spring force. In the opened state of the fuel valve, the fuel can flow into the combustion chamber of the burner in order for the flame to be maintained. The thermocouple cools once the flame is extinguished, as a result of which the electric voltage generated by the flame temperature by virtue of the thermoelectric effect decreases and, in this instance, is no longer sufficient for the fuel valve to be kept open any longer. The fuel valve is then closed as a result of the effect of the spring force.

A method of this type is easy to implement in constructive terms and is moreover also very robust. However, it has the decisive disadvantage that the thermocouple, conjointly with the protective sheath thereof, requires a certain period for cooling when the flame is extinguished. The electric voltage which is generated by virtue of the thermoelectric effect remains sufficiently high during this period in order for the fuel valve to continue to be kept in the opened position. In practice, it can therefore easily take up to 30 seconds until the fuel valve is closed. For this reason, this method according to the relevant standards is only permitted in semi-automatic burners but not in automatic burners which are used in the domestic sector, in particular in gas condensing boiler devices, and in industrial applications. This is because the relevant standards, such as DIN EN 298:2012-11, for example, require a closing time of the fuel valves of 1 second after the flame is extinguished.

The gas burner systems known from the prior art are often operated using aliphatic fuels such as natural gas, for example. However, these aliphatic fuels have the disadvantage that a not insignificant quantity of carbon dioxide ($CO_2$) is generated during the combustion process. In order to reduce carbon dioxide emissions of this type, gas burner systems which are configured such that they can be operated using a mixture of hydrogen and an aliphatic fuel, in particular using a hydrogen/natural gas mixture, or else using 100% hydrogen (with the exception of unavoidable contaminations) as a fuel, are already known from the prior art. Furthermore, hydrogen has the maximum energy density in comparison to other fuels such as, for example, mineral oil or natural gas. The use of hydrogen, or of a hydrogen/natural gas mixture, respectively, as the fuel in a gas burner system affects the operating parameter of the burner, such as also the air-fuel ratio k, which is also referred to as the air ratio. This air-fuel ratio $\lambda$ is defined as the quotient of the air mass actually available for the combustion process and the minimum required air mass that is theoretically required for complete stoichiometric combustion.

An example for a gas burner system which can be operated with a fuel proportion of up to 100% hydrogen is known from WO 2020/192902 A1.

SUMMARY

The object of the disclosed system lies in making available a method for monitoring an operation of a gas burner system, as well as a gas burner system, which enable a reliable and safe operation of the gas burner system.

In a method for monitoring an operation of a gas burner system, wherein a fuel/air mixture is ignited and a flame is generated by a burner during the operation of the gas burner system, it is provided that the temperature of the flame is measured by a flame temperature measurement installation that is actively cooled by impingement with cooling air and the temperature of the flame is evaluated by an evaluation installation, wherein a fuel supply to the burner is interrupted when the temperature of the flame drops below a critical value or at a specific negative gradient, and wherein an air-fuel ratio is determined from the temperature of the flame, and the fuel supply to the burner is interrupted in the event of an anomaly in the air-fuel ratio.

In the described method for monitoring the operation of a gas burner system, it is thus provided that the flame temperature measurement installation by which the temperature of the flame is detected is permanently actively cooled with the cooling air as a result of a forced convection. This cooling air moves about the flame temperature measurement installation and in particular also in a region between the flame temperature measurement installation and a protective sheath for the latter, the flame temperature measurement installation preferably having one or a plurality of thermocouples. The permanent active cooling of the flame temperature measurement installation by the cooling air has the effect that the flame temperature measurement installation cools faster than without active cooling after the flame has been extinguished. As a result, the response time between the extinction of the flame and the closing of the fuel valve for interrupting the fuel supply is effectively shortened in an advantageous manner.

In addition to the detection of the presence, or the absence, respectively, or else of the creation of the flame, a further characteristic can thus be measured sufficiently fast based on the principle of active cooling of the flame temperature measurement installation as proposed here: This here is the air-fuel ratio, or the fuel-to-air ratio, likewise forming important operating parameters of the burner.

The described system proceeds from the concept that the flame temperature which can be measured very fast by the actively cooled flame temperature measurement installation is likewise a measure for the air-fuel ratio k, or the fuel-to-air ratio, respectively. Using the actively cooled flame temperature measurement installation it is advantageously possible to establish sufficiently fast a variance in the air-fuel ratio, or in the fuel-to-air ratio, respectively, from the optimum air-fuel ratio, or from the optimum fuel-to-air ratio, respectively, in ranges which are unfavorable in terms of the combustion process, and to deactivate the fuel supply. In terms of aspects relating to technical safety, this would be excessively slow in the absence of the active cooling of the flame temperature measurement installation.

In one advantageous implementation, for cooling purposes part of the process air which is supplied to the combustion chamber of the burner by a ventilation installation, for example, or is inducted into the combustion chamber of the burner by an exhaust gas ventilation installation, is diverted and utilized as cooling air for actively cooling the flame temperature measurement installation. The remaining part of the process air forms combustion air for the combustion process of the fuel within the combustion chamber.

The measurement signal of the flame temperature measurement installation is preferably read by a fail-safe input module of the evaluation installation and is evaluated, in particular in an analog manner (i.e., via the signal profile of the measurement signal but not digitally by limit values). A shutdown signal for the fuel valve is generated here as soon as it is established that the measured temperature drops below a defined temperature limit value or at a specific negative (critical) gradient, or an anomaly in the air-fuel ratio is established. On the basis of the flame temperature, an extinction of the flame can thus be established absolutely in static terms (flame temperature drops below a specific limit value) as well as in dynamic terms (flame temperature has a specific negative gradient which indicates extinction). As a result of the active cooling of the flame temperature measurement installation, a corresponding drop in the temperature of the flame is able to be established faster and more reliably than without cooling. In one advantageous implementation, the presence of the flame can furthermore be established by a constant high temperature, and a creation of the flame can be established by an increasing temperature. In this context, the gradient behavior of the temperature of the flame measured by the flame temperature measurement installation is preferably evaluated in order to detect potential temperature variations. As a result, it can be very easily detected whether the temperature of the flame increases, drops or is constant.

An increase/drop in the temperature of the process air, or of the cooling air, respectively, will inevitably lead to an increase/drop of the measured flame temperature. In order to prevent that an increase/drop of the temperature of the process air, or of the cooling air, respectively, is wrongly judged to be a flame being created/extinguished, in one advantageous implementation, the temperature of the process air, and thus also of the cooling air diverted therefrom, is additionally measured by an air temperature measurement installation at a position which cannot be influenced by the flame, and the temperature is evaluated by the evaluation installation. The air temperature measurement installation is preferably disposed within the air supply line. When an increase/drop in the temperature is likewise detected by the air temperature measurement installation, this temperature variation is advantageously not taken into account when evaluating the flame temperature, and the temperature variation is thus not judged to be a flame being created or extinguished, respectively, by the evaluation installation.

In one advantageous implementation, a failure in the supply of the process air is monitored by a pressure measurement installation which is preferably accommodated within the air supply line. This pressure measurement installation detects the pressure of the process air and thus also of the cooling air. When a failure in the supply of the process air is identified, the fuel valve is closed so that the fuel supply into the combustion chamber is interrupted.

The flame temperature measurement installation is disposed such that the latter measures the flame temperature. Because the flame temperature is constant at a constant fuel-to-air ratio, or at a constant air-fuel ratio, respectively, and in the event of an intact flame/intact combustion of the fuel/air mixture, that is to say is independent of the output of the burner (which can vary in the case of a modulating burner), a drop in the burner output will not lead to a drop in the measured temperature, and thus will not lead to the fuel valve being closed by virtue of an extinguishing flame having been incorrectly established.

A gas burner system according to the description comprises: a burner having a combustion chamber; a fuel supply line as well as an air supply line which are connected to the combustion chamber of the burner; at least one fuel valve which is accommodated within the fuel supply line and can selectively be opened and closed to release and shut off the fuel supply into the combustion chamber of the burner; a control installation by which the operation of the gas burner system is able to be controlled; an actively cooled flame temperature measurement installation which is configured for measuring the temperature of the flame; and an evaluation installation which is configured for evaluating temperature measurement data of the flame temperature measurement installation and for transmitting the results of the evaluation to the control installation, wherein the control installation is configured for generating a shutdown signal for the fuel valve when the temperature of the flame drops below a critical value, or the temperature drops at a specific negative gradient, and wherein the evaluation installation is configured for determining an air-fuel ratio from the temperature of the flame, and wherein the control installation is configured for generating a shutdown signal for the fuel valve in the event of an anomaly in the air-fuel ratio.

The described gas burner system, which is based on concepts of the method already described in detail above, enables a safe operation of the gas burner system because an extinction of the flame in particular, or an anomaly in the air-fuel ratio, can be identified very fast by virtue of the active cooling of the flame temperature measurement installation, so that a very fast shutdown of the fuel supply can take place.

In one preferred implementation, there is the possibility for the gas burner system to have a bypass line within which the flame temperature measurement installation is accommodated and the bypass line is disposed such that the latter branches off from the air supply line such that part of the process air flowing through the air supply line during the operation of the gas burner system is diverted into the bypass line and forms cooling air for actively cooling the flame temperature measurement installation. The remaining part of the process air that does not flow through the bypass line forms the combustion air for the fuel within the combustion chamber of the burner.

In one particularly preferred implementation, it can be provided that an air temperature measurement installation is accommodated within the air supply line. Via the air temperature measurement installation, the temperature of the process air can be measured at a location which is not influenced by the flame temperature.

In one advantageous implementation, there is the possibility for a pressure measurement installation to be accommodated within the air supply line. It can be detected by the pressure measurement installation whether the process air is available.

In one particularly advantageous implementation, it is proposed that the gas burner system is specified for an operation with a fuel which is composed of a mixture of an aliphatic fuel and hydrogen or, with the exception of natural contaminations, is composed exclusively of hydrogen. In principle, however, a purely aliphatic fuel such as natural gas, for example, can also be used.

An advantage of the method as well as of the gas burner system described here lies in particular in the simplicity in terms of sensor technology. This is because only a flame temperature measurement installation having one or a plurality of thermocouples is required, the latter typically being composed of only two dissimilar metals welded to one another, so that the flame temperature measurement installation can be implemented in a very simple and cost-effective manner. In comparison, the optical sensor installations which are likewise customary for monitoring flames and are based on UV light detection, for example, are embodied in a substantially more complex manner.

BRIEF DESCRIPTION OF THE DRAWINGS

FIG. 1 is a schematic diagram of a gas burner system according to the described implementation.

DETAILED DESCRIPTION

Further features and advantages of example implementations of the described system and methods will be explained in more detail with reference to the appended FIG. 1 showing a fundamental construction of a gas burner system 1 in a highly simplified schematic manner. Details of a method for monitoring an operation of the gas burner system 1 are also to be explained in more detail by this illustration.

The gas burner system 1 comprises a burner 2 having a combustion chamber 20, a fuel supply line 3 as well as an air supply line 4 which are connected to the combustion chamber 20 of the burner 2. A fuel valve 12 which can selectively be opened and closed so as to release or shut off, respectively, the fuel supply into the combustion chamber 20 of the burner 2 is accommodated within the fuel supply line 3.

During the operation of the gas burner system 1, a fuel is directed into the combustion chamber 20 of the burner 2 via the fuel supply line 3. Process air is supplied via the air supply line 4, wherein part of the process air forms combustion air for the combustion process and is introduced into the combustion chamber 20 of the burner 2. As a result, an ignitable fuel/air mixture is attained within the combustion chamber 20 of the burner 2 during the operation of the gas burner system 1 and is correspondingly ignited by an ignition installation not explicitly illustrated here so that a flame 5 is generated. An aliphatic fuel, such as natural gas, for example, can be used as a fuel. However, it is preferable to use a mixture of hydrogen and an aliphatic fuel, in particular natural gas, as the fuel. In one particularly advantageous variant, the gas burner system 1 is embodied such that the burner 2, with the exception of natural contaminations, can be operated using 100% hydrogen as the fuel.

As can be seen in FIG. 1, the gas burner system 1 has a bypass line 6 within which a flame temperature measurement installation 7 is accommodated, the latter being configured for measuring the flame temperature of the flame 5. As a result of the bypass line 6, a specific proportion of the process air from the air supply line 4 can bypass the combustion chamber 20 of the burner 2 such that this proportion of air no longer contributes as combustion air toward the combustion process of the fuel/air mixture but can be utilized as cooling air for active cooling of the flame temperature measurement installation 7 as a result of forced convection. The combustion air can be supplied to the combustion chamber 20 of the burner 2 by a ventilator, for example, or can be inducted into the combustion chamber 20 of the burner 2 by an exhaust gas ventilator.

An air temperature measurement installation 8, which is configured for measuring the temperature of the process air, as well as a pressure measurement installation 9 which is configured for measuring the air pressure within the air supply line 4, are accommodated within the air supply line 4. The pressure measurement installation 9 is preferably embodied such that the pressure measurement installation 9 is specified for analog pressure measurement and thus does not detect a digital switching threshold, but continually measures the pressure of the process air in an analog manner.

The gas burner system 1 furthermore comprises a control installation 10 which is configured for controlling and monitoring the operation of the gas burner system 1. The control installation 10 is in particular specified for generating a release signal, or a shutdown signal, respectively, for the fuel valve 12. Moreover, provided is an evaluation installation 11 which is connected to the flame temperature measurement installation 7, the air temperature measurement installation 8 as well as to the pressure measurement installation 9 so as to receive and evaluate data measured by these measurement installations. The evaluation installation 11 in turn is connected to the control installation 10. While the evaluation installation 11 and the control installation 10 in the present case have been illustrated as two separate installations in the drawings, it is in principle possible for the functions of the installations to be integrated in a single unit, in particular in the control installation 10, thus increasing the degree of integration.

In the present case, the flame temperature measurement installation 7 is permanently cooled by the cooling air by way of a forced convection. To this end, part of the process air, which is in any case applied by the air supply line 4 and partially makes its way past the combustion chamber 20 into the bypass line 6 is utilized as cooling air. This cooling air here moves about the flame temperature measurement installation 7 and in particular between this flame temperature measurement installation 7 and a protective sheath, the flame temperature measurement installation 7 preferably having one or a plurality of thermocouples. This permanent cooling of the flame temperature measurement installation 7 as a result of forced convection has the effect that the flame temperature measurement installation 7 cools faster when the flame 5 is extinguished than without this active cooling. As a result of this measure, it is advantageously possible to significantly shorten a shutdown time between the extinction of the flame 5 and the closing of the fuel valve 12.

The measurement signal of the flame temperature measurement installation 7 is read by a fail-safe input module of the evaluation installation 11 and is evaluated in an analog manner (i.e., via the profile of the measurement signal but not digitally via limit values) by the evaluation installation 11. As soon as it is established that the measured flame temperature has dropped below a critical limit value, or the measured flame temperature drops at a specific (critical) negative gradient which indicates extinction of the flame 5, a shutdown signal for the fuel valve 12 which has the effect that the fuel valve 12 closes such that the fuel supply into the combustion chamber 20 of the burner 2 is interrupted is generated by the control installation 10. As a result of the active cooling of the flame temperature measurement installation 7, a corresponding drop of the temperature is able to be established faster and more reliably than without cooling. Furthermore, by evaluating the measurement signals of the flame temperature measurement installation 7, an existing flame 5 can be reliably established detecting a substantially constant high temperature, and a flame 5 being created can be reliably established by detecting a rising temperature. In this context, the gradient behavior of the temperature of the flame 5 measured by the flame temperature measurement installation 7 is preferably evaluated so as to detect potential temperature variations. As a result, it can be detected in a very simple manner whether the temperature of the flame 5 increases, drops, or is constant.

An increase/drop in the temperature of the process air will inevitably lead to an increase/drop in the flame temperature. In order to prevent that an increase/drop in the temperature of the process air is wrongly judged to be a flame 5 being created/extinguished, the temperature of this process air is additionally measured at a location which cannot be influenced by the flame 5. This takes place via the air temperature measurement installation 8 which is disposed within the air supply line 4. If an increase/drop in the temperature of the air is detected by the air temperature measurement installation 8, this temperature variation is not taken into account when evaluating the flame temperature by the evaluation installation 11 and is thus not judged to be a flame 5 being created or extinguished, respectively.

The same applies in an analogous manner to the pressure of the process air that is measured by the pressure measurement installation 9, wherein an increase in the pressure leads to a reduction in the flame temperature by virtue of a greater expansion in the flame 5, and a decrease in pressure leads to an increase in the flame temperature by virtue of a lesser expansion in the flame 5. The pressure of the fuel does not have to be taken into account in this context, because a gas pressure regulator which is to guarantee a constant gas pressure is always prescribed in the relevant standards of combustion technology.

Other factors which may influence the flame temperature, such as the construction of the burner 2, for example, and the proportion of nitrogen in the combustion air, can be considered to be more or less constant and therefore do not have to be compensated for by any complexity in terms of corresponding method management.

A deterioration (anomaly) in the fuel-to-air ratio which leads to a reduction in the flame temperature does not have to be compensated for in any manner, because this anomaly is judged to be an extinguished flame 5, this even being desirable under these conditions because the fuel supply has likewise to be switched off by closing the fuel valve 12 in this case. This behavior further contributes toward the operational reliability of the gas burner system 1.

A failure in the supply of the process air, as well as the pressure of the process air, are monitored by the pressure measurement installation 9 within the air supply line 4. When a failure of this air supply is identified, the fuel valve 12 is closed. This likewise contributes towards the operational safety of the gas burner system 1. When a gas participating in the combustion process, such as the combustion air, for example, expands during combustion because the gas is supplied at a higher pressure, this can likewise lead to a reduction in the flame temperature by virtue of the Joule-Thomson effect. This temperature behavior per se does not have to be taken into account but already demonstrates that pressure variations of the combustion air, similar to the temperature of the combustion air, have an influence on the flame temperature and therefore have to be taken into account in the evaluation of the flame. This is because a potential pressure reduction, like a temperature increase, in the combustion air could conceal an extinguishing flame 5.

The flame temperature measurement installation 7 has to be attached such that the latter can reliably measure the temperature of the flame 5. Because the flame temperature is constant at a constant fuel-to-air ratio, or a constant air-fuel ratio, respectively, and an intact flame 5/orderly combustion, i.e., is independent of the output of the burner 2, the output by all means potentially varying in the case of the modulating burner 2, a drop in the burner output will not lead to a drop in the measured temperature and thus also not lead to the fuel valve 12 being closed by virtue of an extinguishing flame 5 having been incorrectly established.

The advantage of the solution described here lies in particular in the simplicity in terms of sensor technology. This is because only a flame temperature measurement installation 7 having one or a plurality of thermocouples is required, the latter typically being composed of two dissimilar metals welded to one another, so that the flame temperature measurement installation 7 can be implemented in a very simple and cost-effective manner.

The flame monitoring of the gas burner system 1 according to the method proposed here can take place as follows, for example:

State 1: The burner 2 is switched off. The measurement data of the air temperature measurement installation 8 as well as of the flame temperature measurement installation 7 are not evaluated.

State 2: The burner 2 is activated. Preliminary venting takes place first. By virtue of the airflow supplied, the air temperature measurement installation 8 and the flame temperature measurement installation 7 both adopt the temperature of the process air supplied via the air supply line. In order to increase the possibilities for identifying errors, both measured temperatures are preferably monitored for plausibility by the evaluation installation 11.

State 3: The burner 2 is ignited and the fuel/air mixture is set on fire so that the flame 5 is created. An increase in the flame temperature which is measured by the flame temperature measurement installation 7 is judged to be a flame 5 being created. A specific flame temperature has to be reached until a defined safety period for the ignition has elapsed. If this does not occur, the burner 2 is switched off in that the fuel supply to the burner 2 is interrupted by closing the fuel valve 12.

State 4: The burner 2 is ignited but the flame 5 has yet to stabilize itself. The flame temperature which is measured by the flame temperature measurement installation 7 may still slightly vary at a high level. However, the flame temperature must be stable at a high level after a specific time. If this does not occur, the burner 2 is switched off in that the fuel supply is interrupted by closing the fuel valve 12.

State 5: The burner 2 is in operation; the flame 5 is stable. A drop in the flame temperature which is measured by the flame temperature measurement installation 7 is judged to be an extinguishing flame 5. The burner 2 is switched off in that the fuel supply is interrupted by closing the fuel valve 12. A drop in the flame temperature can likewise be caused by an increasing or decreasing air-fuel ratio. The monitoring of the flame temperature described here can however not distinguish this effect from an extinguishing flame 5. However, this is not critical but even desirable because an increasing or decreasing air-fuel ratio can likewise lead to potentially dangerous situations during the operation of the burner 2. When an anomaly in the air-fuel ratio is established, the burner 2 is switched off in that the fuel supply is interrupted by closing the fuel valve 12.

What is claimed is:

1. A method for monitoring an operation of a gas burner system in which a fuel/air mixture is ignited and a flame is generated by a burner during the operation of the gas burner system, the method comprising:
   measuring a temperature of the flame by a flame temperature measurement installation that is actively cooled by impingement with cooling air;
   evaluating the temperature of the flame by an evaluation installation;
   measuring the temperature of the cooling air by an air temperature measurement installation at a position outside a temperature influence range of the flame;
   evaluating the temperature of the cooling air by the evaluation installation;
   interrupting a fuel supply to the burner in response to the temperature of the flame dropping below a critical value or at a rate faster than a specific negative gradient;
   determining an air-fuel ratio from the temperature of the flame; and
   interrupting the fuel supply to the burner in the event of an anomaly in the air-fuel ratio.

2. The method of claim 1, wherein a portion of process air supplied to the burner is diverted for providing the cooling air for the flame temperature measurement installation.

3. The method of claim 1, wherein a gradient behavior of the temperature of the flame is evaluated.

4. The method of claim 1, wherein a pressure of the cooling air is detected by a pressure measurement installation and evaluated by the evaluation installation.

5. A gas burner system, comprising:
   a burner for generating a flame, the burner including a combustion chamber;
   a fuel supply line and an air supply line that are connected to the combustion chamber;
   at least one fuel valve accommodated within the fuel supply line and capable of being selectively opened and closed to release and shut off a fuel supply into the combustion chamber;
   a control installation to control operation of the gas burner system and to generate a shutdown signal for the fuel valve in response to the temperature of the flame dropping below a critical value, or the temperature dropping at a rate that is at least as fast as a specific negative gradient;
   a flame temperature measurement installation to measure a temperature of a flame generated by the gas burner system;
   an air temperature measurement installation accommodated within the air supply line; and
   an evaluation installation to: evaluate temperature measurement data of the flame temperature measurement installation; supply evaluation results to the control installation; and determine an air-fuel ratio from the temperature of the flame, wherein the control installation generates a shutdown signal for the fuel valve in the event of an anomaly of the air-fuel ratio.

6. The gas burner system of claim 5, further comprising:
   a bypass line within which the flame temperature measurement installation is accommodated, wherein the bypass line branches off from the air supply line such that part of process air flowing through the air supply line during operation of the gas burner system is diverted into the bypass line and forms cooling air for actively cooling the flame temperature measurement installation.

7. The gas burner system of claim 5, further comprising a pressure measurement installation accommodated within the air supply line.

8. The gas burner system of claim 5, wherein the gas burner system is specified for operating with a fuel composed of a mixture of an aliphatic fuel and hydrogen or, with the exception of natural contaminations, is composed exclusively of hydrogen.

9. A method for monitoring an operation of a gas burner system in which a fuel/air mixture is ignited and a flame is generated by a burner during the operation of the gas burner system, the method comprising:
   measuring a temperature of the flame by a flame temperature measurement installation that is actively cooled by impingement with cooling air;
   evaluating the temperature of the flame by an evaluation installation;
   measuring the temperature of the cooling air by an air temperature measurement installation at a position outside a temperature influence range of the flame;
   evaluating the temperature of the cooling air by the evaluation installation; and
   interrupting a fuel supply to the burner in response to the temperature of the flame dropping below a critical value or at a rate faster than a specific negative gradient.

10. The method of claim 9, wherein a portion of process air supplied to the burner is diverted for providing the cooling air for the flame temperature measurement installation.

11. The method of claim 9, wherein a gradient behavior of the temperature of the flame is evaluated.

12. The method of claim 9, wherein a pressure of the cooling air is detected by a pressure measurement installation and evaluated by the evaluation installation.

* * * * *